US006809630B1

(12) United States Patent
Dreimann et al.

(10) Patent No.: US 6,809,630 B1
(45) Date of Patent: Oct. 26, 2004

(54) MOTOR VEHICLE DOOR LOCK SYSTEM

(75) Inventors: Thomas Dreimann, Berlin (DE); Rainer Josef Berger, Remscheid (DE); Stephan Schmitz, Köln (DE); Christian Gerhardt, Hattingen (DE); Gregor Buedding, Duisburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/657,104

(22) Filed: Sep. 7, 2000

(30) Foreign Application Priority Data

Sep. 7, 1999 (DE) ........................................ 199 42 572
Nov. 29, 1999 (DE) ........................................ 199 57 417

(51) Int. Cl.[7] ................................................ G05B 19/00
(52) U.S. Cl. ...................................... 340/5.62; 340/543
(58) Field of Search ................................ 340/5.62, 5.1, 340/5.2, 5.63, 5.65, 10.5, 825.69, 825.72; 292/336.3

(56) References Cited

U.S. PATENT DOCUMENTS 4,197,524 A * 4/1980 Salem ........................ 340/5.51
5,240,296 A 8/1993 Kobayashi
5,769,471 A * 6/1998 Suzuki et al. ............ 292/336.3
5,973,611 A * 10/1999 Kulha et al. ............... 340/5.62
6,031,465 A * 2/2000 Burgess ...................... 340/5.54
6,062,613 A 5/2000 Jung et al.
6,188,326 B1 * 2/2001 Flick ..................... 340/825.69
6,411,195 B1 * 6/2002 Goldman .................... 340/5.1

FOREIGN PATENT DOCUMENTS

DE 29 46 288 A1 5/1981
DE 42 12 291 A1 10/1993
DE 195 21 024 12/1996
DE 195 21 024 A1 12/1996
DE 196 27 246 A1 1/1997
DE 196 17 038 A1 11/1997
DE 196 17 038 11/1997
DE 196 29 709 1/1998
DE 196 29 709 A1 1/1998
DE 197 52 974 9/1998
DE 197 52 974 A1 9/1998
DE 197 40 523 A1 3/1999
EP 0 589 158 A1 3/1994
EP 0 992 408 A2 4/2000
EP 1 001 118 A1 5/2000
WO WO 99/19585 4/1999
WO WO 99/28170 6/1999

* cited by examiner

*Primary Examiner*—Michael Horabik
*Assistant Examiner*—William Bangachon
(74) *Attorney, Agent, or Firm*—Nixon Peabody LLP; David S. Safran

(57) ABSTRACT

A motor vehicle door lock system with at least one vehicle lock, an outside door handle assigned to the vehicle lock, and at least one sensor assigned to the outside door handle, where the system is adapted to detect the approach of the hand of an operator to the outside door handle and/or touching and/or activating of the outside door handle. In one embodiment of motor vehicle door lock system, the activation of the outside handle by the hand of an operator or the approach to the outside door handle is recognized early. A vibration generator is assigned to the outside door handle such that the outside door handle or a part thereof is mechanically vibrated. A sensor is provided for acquiring the vibration, the sound waves caused by the vibration and/or their reflections so that the motor vehicle door lock system can detect when the outside door handle or a part thereof is being approached and/or touched and/or activated by the hand of an operator.

34 Claims, 6 Drawing Sheets

MOTOR VEHICLE DOOR LOCK SYSTEM

BACKGROUND OF THE INVENTION

1. Field of the Invention

The invention relates to a motor vehicle door lock system with an outside door handle, and at least one sensor for detecting the approach of the hand of an operator to the outside door handle and/or touching and/or activating of the outside door handle.

2. Description of Related Art

Conventional electromechanical motor vehicle door lock systems having a radio remote control but without the passive entry function are generally known. In these conventional vehicle door lock systems, the operator presses a button on the remote control module. This activates the control electronics which passes through its reaction phase immediately. Because of the distance of the operator from the vehicle door, by the time the operator reaches the outside door handle on the motor vehicle door, the reaction phase of the control electronics has long been completed and the motor vehicle lock has been unlocked. By pulling on the outside door handle, the operator opens the motor vehicle door and the motor vehicle lock is opened either mechanically so that the detent pawl is lifted by the motion of the outside door handle, or electromechanically or pneumatically, the outside door handle delivering a control signal to the opening drive to raise the detent pawl.

Control electronics with a passive entry function, also known as an "electronic key", differ from the above explained conventional motor vehicle door lock systems in that on the remote control module, no manipulation is necessary. Therefore a button need not be pressed to unlock the motor vehicle lock when approaching the motor vehicle. Rather this takes place all by itself when the operator approaches the motor vehicle.

As used herein, a passive entry function is defined especially as automatic data interrogation or identification of an operator held data medium, transponder or the like so as to ascertain whether an operator approaching the motor vehicle or about to open the vehicle or its door is authorized for access. This is generally checked by the corresponding electronics of the motor vehicle. With corresponding authorization of the operator, automatic unlocking of the vehicle lock takes place by a central interlock system which typically opens the door lock of the driver-side door or of the door being approached by the operator and the door with the handle being touched or activated.

A motor vehicle door lock system with a passive entry function for the control electronics requires a certain reaction phase or time which includes a starting interval to activate the system as the data medium or the remote control module approaches, an authorization check interval to check the operator for his/her authorization by using the coding of the signals exchanged between the remote control module and the control electronics, and finally, the actual action interval in which the action such as the unlocking of the motor vehicle lock takes place. A corresponding reaction phase is also required when locking the vehicle door lock system. However, this corresponding reaction phase is less critical because it is essentially unnoticed by the operator.

The length of the reaction phase of roughly a few hundred milliseconds (as compared to conventional motor vehicle door lock systems) is perceived as being long if the starting interval is begun only when the outside door handle is activated. Pulling the outside door handle or the like occur in a passive entry function under certain circumstances when the reaction phase of the control electronics has not yet been completed. In such occurrences, the operator can then become annoyed that he/she must pull the door handle a second time and this is interpreted as a "malfunction".

Since the resulting total time of the reaction phase cannot be shortened as much as desired, attempts have already been made to conceal the delay time. The published German patent application DE -A- 195 21 024 discloses a motor vehicle door lock system in which the starting interval and the authorization check interval of the control electronics are shifted into a phase which precedes the actual operation phase which is noticeable to the operator. Then, only the remaining time which corresponds to the reaction time of mechanical, conventional motor vehicle door lock system is noticeable to the operator. A different solution is to have the starting interval of the control electronics initiated not only when the outside door handle is activated, but to use the approach of the hand of an operator to the outside door handle to initiate the starting interval. To do this, the provision of a proximity sensor on the outside door handle is known as disclosed in the published German patent applications DE - A - 197 52 974 and DE - A - 196 17 038. In these references, there is approximately 100 to 150 ms between the sensing of the approaching hand of the operator and the hand actually touching the outside door handle. The starting interval of the control electronics, i.e., the "awakening" of the control electronics, therefore begins so far prior to the actual pulling of the outside door handle that the starting interval, and usually also the authorization check interval, are already completed when the outside door handle is in fact moved by the hand of the operator.

The published German patent application DE - A - 196 17 038 which forms the starting point for the present invention discloses a lock system, especially for motor vehicles, with a passive entry function. One electrode of a capacitive sensor is located on an outside door handle while the other electrode of the capacitive sensor is located on the door-side in order to thereby acquire the approach of the hand of an operator to the outside door handle or in the area between the electrodes and subsequently, to activate the passive entry function.

The use of proximity sensors in motor vehicle door lock systems of the type under consideration entails various difficulties. On the one hand, the proximity sensors have a comparatively high closed-circuit current and on the other hand, it is difficult to set a stable, unequivocal response threshold for such proximity sensors. External effects such as rain, snow, dirt and dust greatly change the measured values in capacitive proximity sensors. Finally, in proximity sensors, the problem of the interfering electromagnetic radiation which they emit cannot be ignored. Therefore, because of these disadvantages, motor vehicle door lock systems with a passive entry function in which only actuation of the outside door handle by the hand of an operator begins the starting interval of the control electronics noted previously have major advantages over systems that utilize proximity sensors.

In addition, in the prior art motor vehicle door lock systems that utilize such proximity sensors, comparatively high complexity is necessary to guarantee proper operation. Furthermore, there is the problem of the comparatively high closed-circuit current. Accordingly, comparatively complex circuitry is necessary which leads to high costs in such systems.

Another problem of the prior art is that it is not possible to distinguish between the approach of the operator to the outside door handle and touching of the outside door handle. Therefore, approaching is acquired with a first sensor while touching or actuating the outside door handle is acquired with yet a second sensor. Accordingly the complexity and costs are further increased.

SUMMARY OF THE INVENTION

The primary object of the present invention is to devise a motor vehicle door lock system and a process for controlling such a system so that the approach of the operator (such as his/her hand) to an outside door handle and/or touching and/or activating of the outside door handle, can be easily detected. This detection allows passive entry function of the motor vehicle door lock system to be activated or the starting interval of the control electronics to be initiated.

The aforementioned object and other objects are achieved by a motor vehicle door lock system in accordance with the present invention which includes an outside door handle arrangement and a piezovibration generator.

In contrast to the prior art which uses capacitive sensing to sense the approach to the outside door handle or the touching of the outside door handle, the motor vehicle door lock system in accordance with the present invention causes the outside door handle (or at least a part thereof) to vibrate mechanically. By means of a sensor, the vibration behavior and/or the sound waves caused by the vibration or their reflections is measured in order to acquire the approach to the outside door handle, the touching of the outside door handle, and/or the activation of the outside door handle.

As used herein, "acquisition" is defined especially as making available data or measurement signals, the evaluation of which enables detection or sensing of whether the hand of an operator has approached the outside door handle or is already touching and/or activating it. The evaluation can take place directly in the electronics assigned to the sensor and/or in separate evaluation electronics or the like. Thus, it should be appreciated that the location of such evaluation is not critical to the practicing of the present invention. Such electronics can be readily devised by a person of ordinary skill in the electronics art and thus, need not be detailed here. However, it is advantageous if the evaluation electronics which make available the corresponding detection signal, is integrated into the outside door handle or an outside door handle arrangement.

In accordance with the embodiments of the present invention, touching the outside door handle is detected or acquired preferably by one of the two following possibilities. First, when the hand of an operator touches or activates the outside door handle, the vibration behavior of the outside door handle changes. This can be measured, for example, by acquiring or evaluating the damping behavior, the change of the resonant frequency, the change of the vibration amplitude, or the like. Second, the outside door handle or at least part thereof, is caused to vibrate such that the sound waves, especially in the ultrasonic range, are emitted. Preferably, these sound waves are reflected back again by adjacent areas of the assigned door and these reflected sound waves again striking the outside door handle and/or the sound waves striking the door are measured. When the hand of an operator touches the outside door handle, especially in grasping it or activating it, the aforementioned sound propagation is interrupted. This interruption in the sound propagation can be acquired and evaluated accordingly.

In both of the aforementioned embodiments of the present invention, the sensing of touching takes place in a comparatively simple manner. In addition or alternatively, proximity sensing can take place. To do this, according to the second aforementioned possibility, sound waves are emitted by the outside door handle or part of it. An approaching hand causes reflection of the sound waves. The reflection of the sound waves is acquired, especially the transit time is acquired and evaluated. Thus the approach of the hand of an operator to the outside door handle can be easily detected.

The sensing of touch and/or approach enables early activation of the passive entry function and initiation of the starting interval of the control electronics. Thus, enough time is gained to unlock the motor vehicle lock before the operator in fact actuates the outside door handle to open the corresponding motor vehicle door or the motor vehicle lock. Another aspect of the present invention is that sensing both of approach and proximity can be done very easily. Thus, the corresponding functions of the motor vehicle door lock system, the control electronics or other electronics of the motor vehicle, can be activated in two stages that are staggered in time.

Preferably, a piezovibration generator is used to produce the mechanical vibration. This component is readily available and are inexpensive. Preferably the vibration generator is operated in the ultrasonic range. This is especially advantageous in the emission of sound waves which are not audible by humans. The vibration generator can be made such that on the one hand, it can cause the outside door handle or part thereof to vibrate, and on the other, can directly emit ultrasonic waves. This is advantageous especially in sensing both the approaching and touching of the outside door handle by the operator.

A sensor for acquiring vibration or sound waves is preferably assigned likewise to the outside door handle, and is preferably arranged like the vibration generator in the outside door handle. However, in other embodiments, the sensor could also be located, for example, in an adjacent area of the door such as the handle shell of an outside door handle arrangement or the like. Alternatively, there can be a separate or additional sensor solely for detection of sound waves, especially in the ultrasonic range. One especially simple and economical embodiment utilizes a vibration generator which also functions as the sensor. In particular, in the pulsed generation of vibration, the vibration generator can then operate in the pulse pauses as a sensor.

According to one especially preferred embodiment of the present invention, sensing of touch takes place. As soon as the hand of the operator touches the outside door handle or its vibrating part, the vibration characteristic changes, especially the vibration amplitude but optionally, also in the vibration frequency. This change is evaluated and the result of the evaluation is used to "awaken" the control electronics, therefore to initiate the starting interval of the control electronics so that then an authorization check interval can follow. This time gain can be sufficient to allow the starting interval, and generally also the authorization check interval, to be completed before the outside door handle is in fact pulled or actuated. Subjectively, the operator perceives that the motor vehicle door lock reacts immediately and passes through the action interval immediately.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENT

Figure 1:
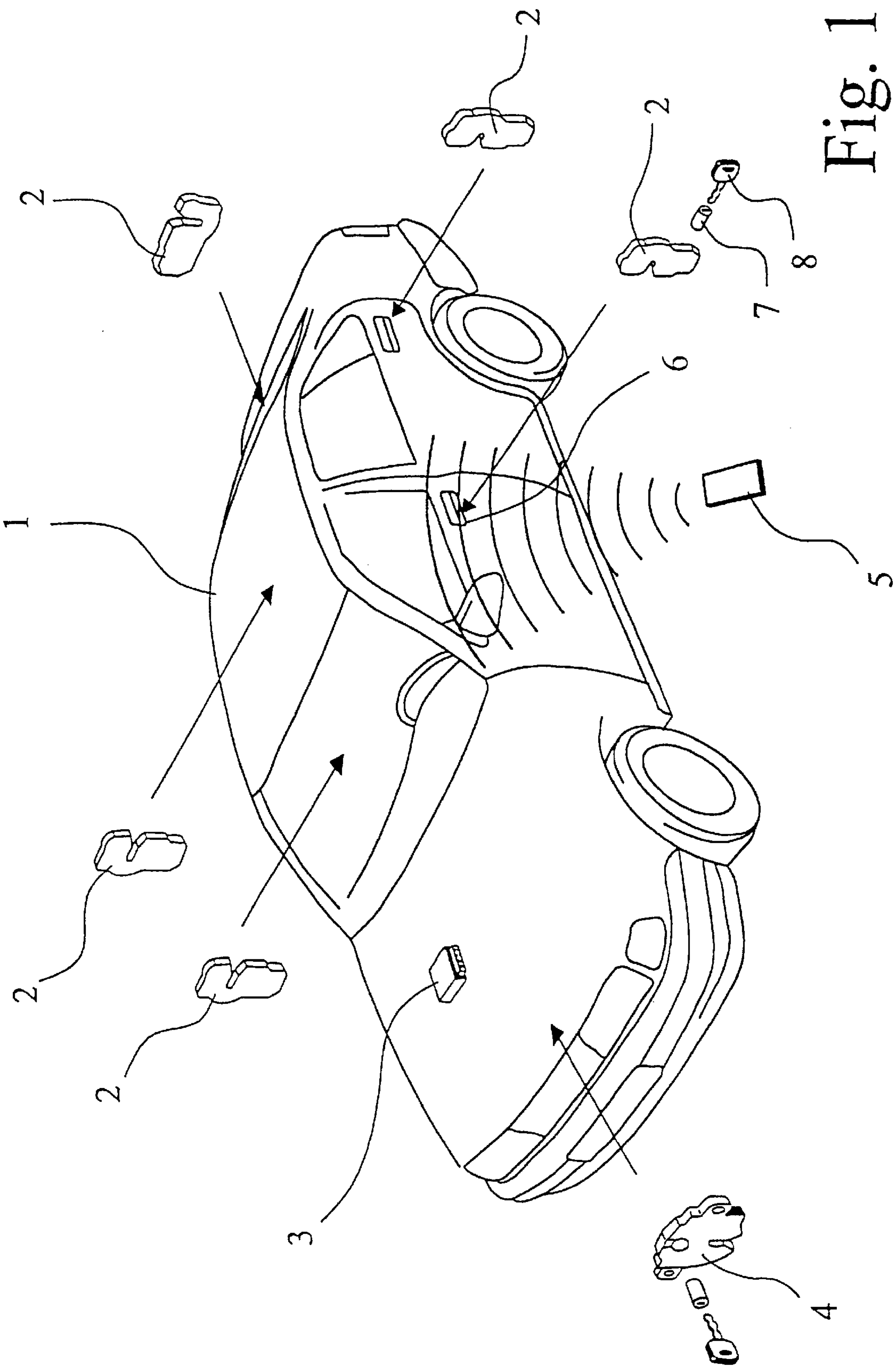
FIG. 1 shows in a schematic and perspective view of a motor vehicle having a door lock system in accordance with the present invention.

The motor vehicle 1 which is shown schematically in FIG. 1 has a vehicle door lock system in which the various vehicle locks 2 for the vehicle doors and vehicle hatches are shown schematically in their installation position. Each motor vehicle lock 2 can be locked and unlocked by a motor, preferably an electric motor (not shown), and likewise in other embodiments, by means of a central interlock drive (not shown). In the illustrated embodiment of the motor vehicle 1 utilizing an electric lock as shown in FIG. 1, the motor vehicle lock 2 additionally has the possibility of motorized opening, therefore lifting of the detent pawl (not shown), by means of an opening drive (not shown). In this case, the locking and unlocking can also be done only using circuitry (not shown). In an alternative embodiments, the motor vehicle 1 includes motor vehicle locks 2 with an auxiliary closing drive (not shown) which can be identical to the opening drive or can be separate from it. In this regard, the teachings of the art references such as the German patent application DE - A - 196 29 709, etc. is noted for disclosing details of the various components noted above that are generally known in the art. The details of these various components are, however, omitted here to avoid repetition.

As can also be seen in FIG. 1, the motor vehicle door lock system in accordance with the present invention includes control electronics 3 which is shown here as the central control electronics, but which can also be assigned in a decentralized manner to each of the motor vehicle locks 2. In the embodiment shown, there are also provided a hood lock 4 which can be operated with a key for the hood of the vehicle 1, and a remote control module 5 which is in the form of a passive entry chipcard. The control electronics 3 works to provide a passive entry function, therefore, with an "electronic key". In this regard, reference is further made to the aforementioned prior art, the details of which having been discussed previously and omitted here to again avoid repetition.

Figure 2:
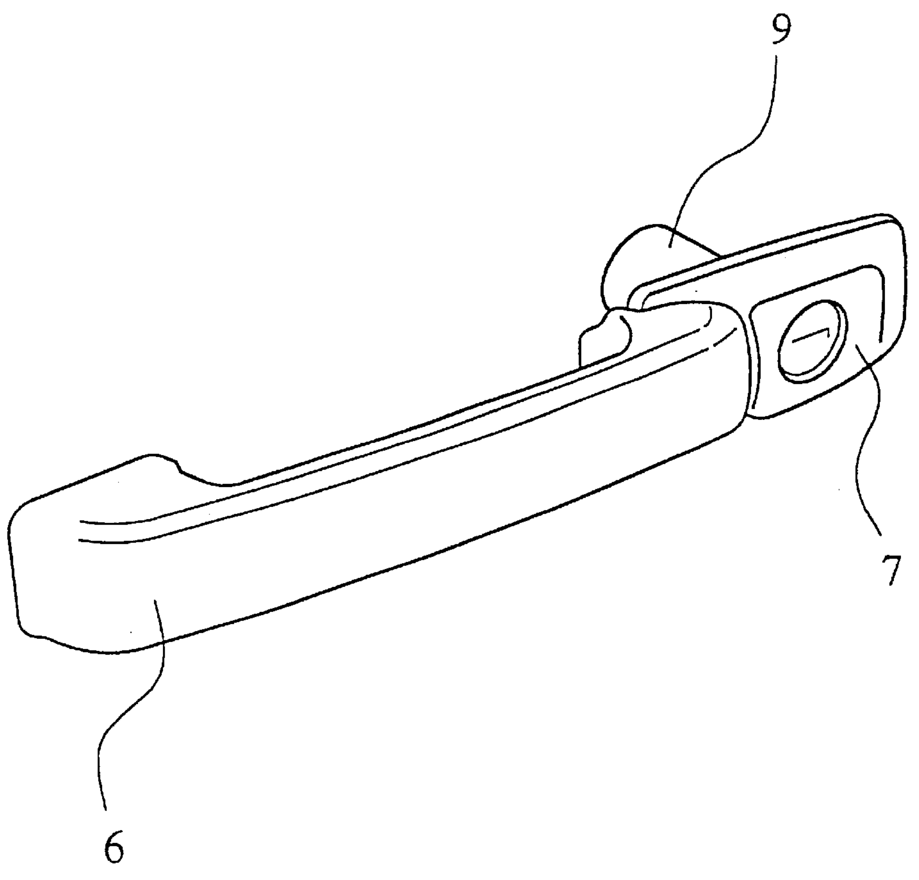
FIG. 2 shows a perspective view of an outside door handle arrangement in a motor vehicle door lock system shown in FIG. 1.

On the motor vehicle body, an outside door handle 6 as shown in FIG. 2 or the like is visible on the respective motor vehicle door. In addition, on the driver-side door, there is a lock cylinder 7 for actuation with a mechanical key 8, this actuation taking place in an emergency to unlock or optionally open the door.

As previously already explained regarding the prior art to which the present invention may be applied, the motor vehicle door lock system with its control electronics 3 requires time to complete a reaction phase with a starting interval, an authorization check interval and an action interval, all of which occurs during the unlocking of the motor vehicle lock 2.

As discussed above, initiating the starting interval of the control electronics 3 by the hand of an operator touching the outside door handle 6 has already been accomplished. FIG. 2 shows a typical door handle arrangement of a motor vehicle door lock system of the type under consideration with the outside door handle 6 and the lock cylinder 7. A switching means 9 on the outside door handle 6 is also shown, with which an operating signal is triggered when the outside door handle 6 is pulled in order to trigger an electrical opening drive (not shown) to lift the detent pawl (not shown), again, the details of which being known in the prior art and omitted here. This is a version of an electric lock. In a mechanically activated lock, there is a transmission mechanism of the conventional design instead of the switching means 9.

Figure 3:
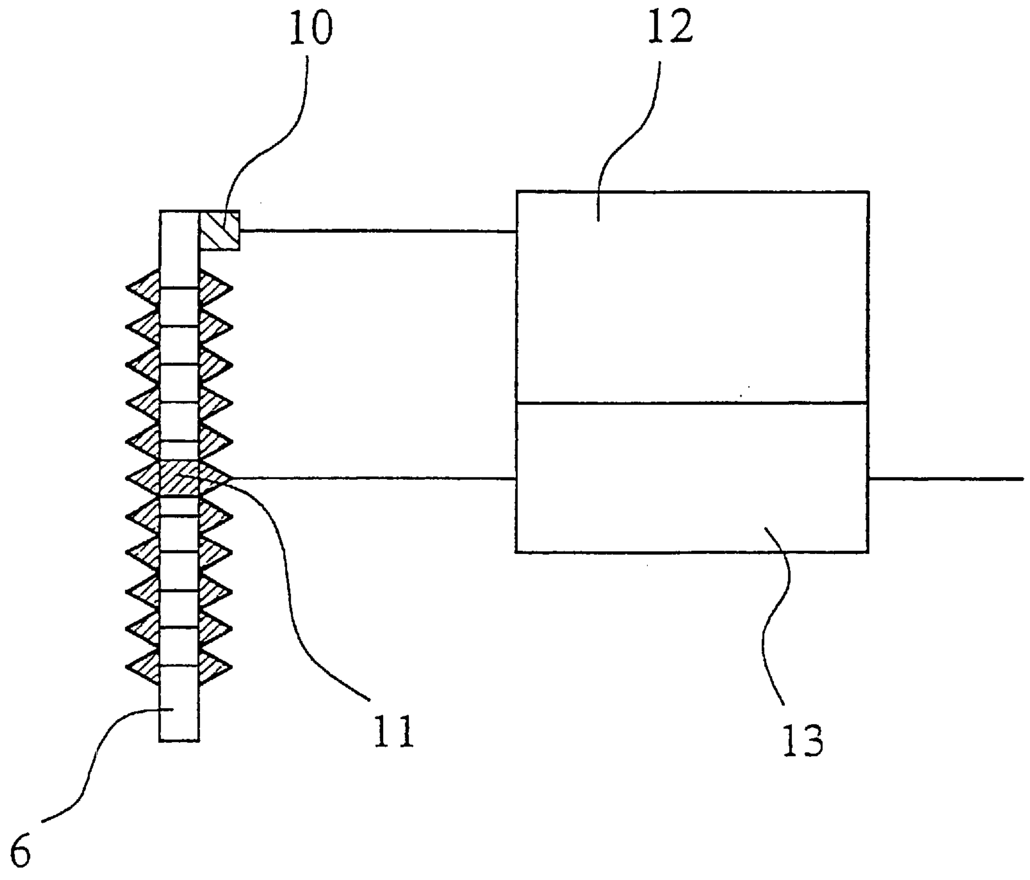
FIG. 3 shows a wiring diagram of an outside door handle arrangement shown in FIG. 2.

FIG. 3 schematically shows the outside door handle 6 which is connected in accordance with one embodiment of the present invention. In this embodiment, the outside door handle 6 is provided with an electric vibration generator 10, and a sensor 11 such as an electric vibration sensor. In this embodiment, the outside door handle 6 is caused to be vibrated by the vibration generator 10 with a frequency and/or amplitude which is picked up and measured by the sensor 11 so that it can be evaluated by the assigned electronics. When the outside door handle 6 is touched by the hand of an operator, the frequency, amplitude and/or damping or decay of the vibration of the outside door handle 6 is changed. This change is evaluated as a signal to initiate the starting interval of the control electronics 3. In this regard, FIG. 3 shows the excitation circuit 12 for the vibration generator 10 and the evaluation circuit 13 for the sensor 11. The evaluation circuit 13 can optionally be a simple trigger.

In terms of evaluation engineering, it should be recommended that the excitation circuit 12 for the vibration generator 10 and the evaluation circuit 13 for the sensor 11 be connected by circuitry directly or within the control electronics 3 by means of a feedback circuit so that the frequency and/or the amplitude of the vibration of the outside door handle 6 can be controlled. By controlling the frequency and/or the amplitude of vibration to a constant measured value and by evaluating the energy required for this purpose, the accuracy of measuring and evaluating the frequency and/or the amplitude can be enhanced.

In accordance with this embodiment of the motor vehicle door lock system, touching or even actuating the outside door handle 6 by the hand of the operator is necessary to initiate the starting interval of the control electronics 3, i.e. to "awaken" the control electronics 3. This starting however, takes place in time at the earliest possible instant. Specifically, this occurs upon the initial contact of the outside door handle 6 with the result that because the actual activation or pulling of the outside door handle 6 takes so long in comparison, the starting interval and the authorization check interval have already been completed and the action interval, generally the lifting of the detent pawl, proceeds without delay for the operator.

With respect to power consumption of the closed-circuit current of the control electronics 3 with the connected electric modules, it is also recommended that the outside door handle 6 be allowed to vibrate at or near its resonance. Preferably, the vibration generator 10 is a piezovibration generator. A piezovibration generator is generally small, can be easily coupled to a component such as an outside door handle 6, and as a special advantage in that it has comparatively low power consumption. In other embodiments, other alternatives for vibration generators 10 can be used which are known from the art, for example, from the article "Lexikon Elektronik und Mikroelektronik", VDI-Verlag Duesseldorf, 1990, p. 765/766.

With respect to the sensor 11, it is preferable that it be made as an acceleration sensor and preferably be placed at the site of an anti-node on the outside door handle 6, especially if the vibration/excitation is at the resonant frequency. The sensor 11 is preferably an acceleration sensor because these sensor elements are durable and very economical, and have an output signal which can be easily evaluated. It is primarily a voltage signal which is then relayed to the control electronics 3 by means of a voltage trigger as the evaluation circuit 13. In this case, when the hand of an operator touches the outside door handle 6, the amplitude of the vibration will drop dramatically together with the acceleration which is measured by the sensor 11 which again, is preferably an acceleration sensor. This signal is evaluated and is used to initiate the starting interval of the control electronics 3. During the following authorization check interval, the control electronics 3 checks the authorization of the operator by exchanging signals with the remote control module 5 and initiates the action interval when the authorization has been ascertained to be positive.

In contrast with the prior art, external effects such as temperature changes, rain, snow, ice and dirt have minimal adverse effect on the function of the motor vehicle door lock system. Preferably, the acceleration sensor according to the requirements known in the prior art, for example, from the aforementioned "Lexikon Elektronik und Mikroelektronik", loc. cit., pp, 766–768, may be readily used for the sensor 11. To take an especially accurate and error-free measurements, two sensors 11 may be assigned to the outside door handle 6 and the measured values of the sensors 11 be averaged or in some other way, evaluated in combination with one another.

With respect to the error sensitivity of the motor vehicle door lock system in accordance with the present invention, further major improvement can be achieved by evaluating the change of frequency and/or amplitude of the vibration or the damping behavior of the outside door handle 6 or a part thereof as a signal for initiating the starting interval when this change takes place with a minimum rate of change. This results in that only a rapid change of the frequency and/or the amplitude of the vibration or the damping behavior of the outside door handle 6 or part thereof it, as is typical for touching the outside door handle 6 by the hand of an operator, leads to the desired signal of the evaluation circuit 13. A creeping, slow change of the frequency and/or of the amplitude or of the damping behavior of the outside door handle 76 or part of it, as is typical of disruptive influences such as weather-induced influences or dirt, does not lead to detection of touching or an output signal of the evaluation circuit 13.

To account for the above noted disruptive influences to the frequency and/or the amplitude of the vibration of the outside door handle 6 which take place with a speed below a lower boundary speed, a feedback circuit re-adjustment may be used. In this way weather-induced effects and/or dirt on the outside door handle 6 are taken into account by the evaluation hardware. The function of the motor vehicle door lock system is thus, not further adversely affected.

Figure 4:
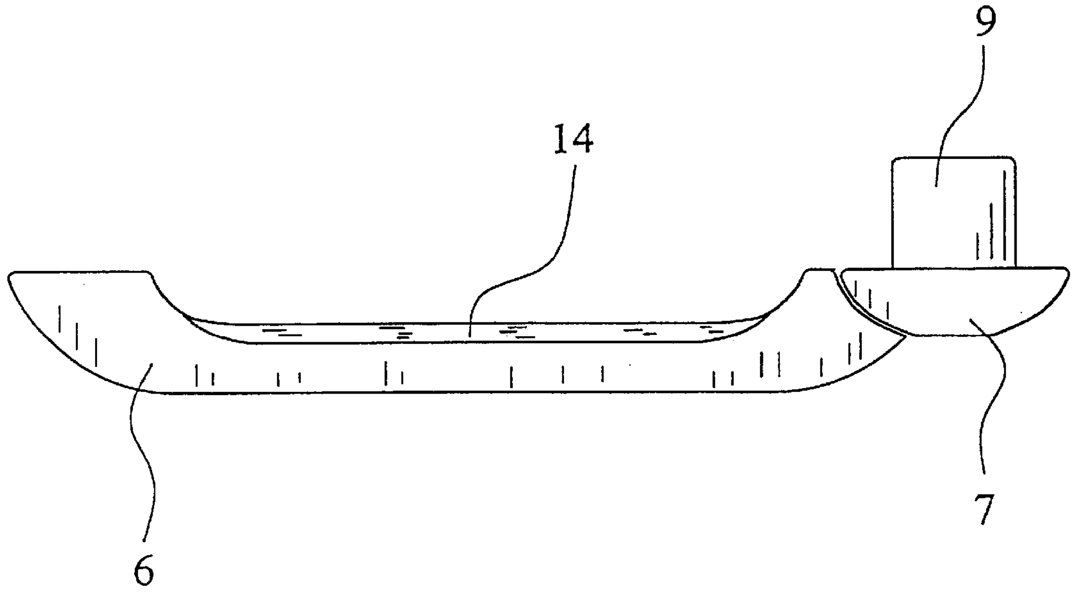
FIG. 4 shows another embodiment of an outside door handle arrangement for use with the motor vehicle door lock system in accordance with the present invention.

It has already been pointed out previously that just one part of the outside door handle 6 can be caused to vibrate instead of the whole outside door handle 6. The smaller the mass of the part which is vibrated, the lower the power consumption of the vibration generator 10. FIG. 4 therefore, shows a version of the teaching of the invention in which only one part of the outside door handle 6, in this example an inside handle shell 14 of the outside door handle 6, is caused to vibrate. Furthermore, this arrangement has the advantage in that the vibration generator 10 can be placed inside and concealed between the part or the handle shell 14 and the remaining outside door handle 6. Also, the electrical terminals for the vibration generator 10 and the sensor 11 or sensors 11 can be easily housed between the handle shell 14 and the remaining outside door handle 6.

Finally, one possible version for further enhancement of the illustrated embodiment is to connect the handle shell 14 or the remainder of the outside door handle 6 via a type of idle stroke connection to the remaining outside door handle 6. In this way, after completed touching of the part of the outside door handle 6, an additional idle stroke occurs and thus, a certain time interval until actual pulling of the outside door handle 6 are obtained to allow triggering of the action interval. Thus, another portion of the authorization check interval can be "concealed in time", i.e. unperceived by the operator.

The subject matter of the present invention is also a correspondingly configured outside door handle arrangement itself which is attached or installed, for example, together with the assigned motor vehicle lock 2 or separately therefrom, to the motor vehicle door, a motor vehicle hatch or the like.

Preferably, the outside door handle 6 or a part thereof, is caused to vibrate in the ultrasonic range and/or the vibration generator 10 works in the ultrasonic range. Here the "ultrasonic range" is defined as vibrations with frequencies in the range from 16 or 20 kHz to roughly $8\times10^9$ Hz. This ensures that sonic waves emitted by the outside door handle 6 or a part thereof and/or the vibration generator 10 are not audible since it is in an ultrasonic range.

Using FIGS. 1 to 4, it has already been explained how the sensing of touching, i.e. acquisition whether the hand of an operator (not shown) is touching or even activating the outside door handle 6 or a part thereof, can be accomplished. As noted previously, "acquisition" is defined especially as making available data or measurement signals, the evaluation of which enables detection or sensing of whether the hand of an operator has approached the outside door handle or is already touching and/or activating it. In the discussed embodiment, it is important that the outside door handle 6 or part thereof vibrates mechanically or is caused to vibrate at least in part and at least at times. The change of the vibration behavior caused by touching, especially the change of the frequency, amplitude and/or damping, is then acquired and evaluated in accordance with the illustrated embodiment of the present invention.

Figure 5:
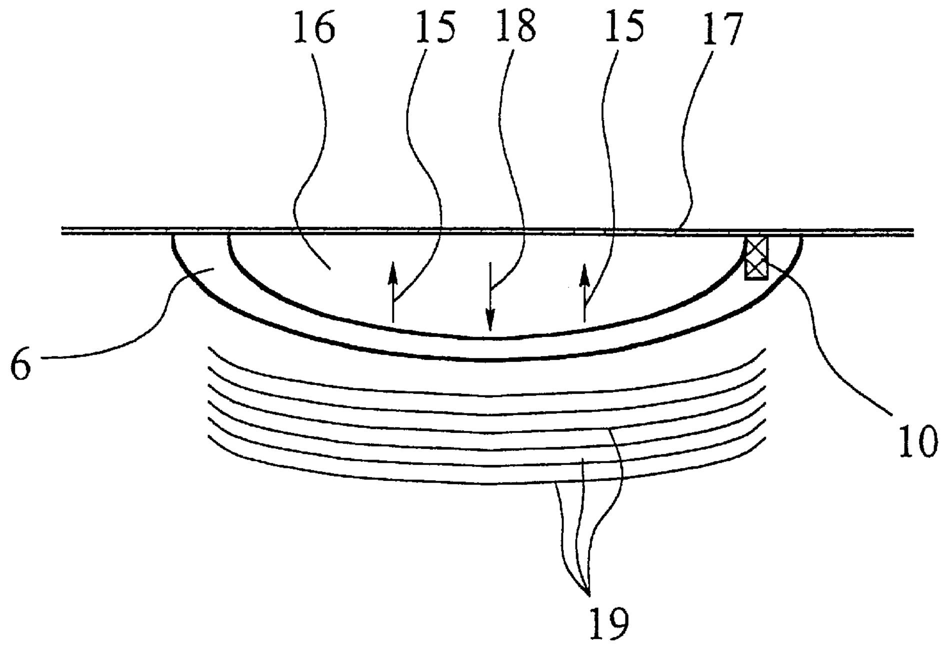
FIG. 5 shows a schematic view of an outside door handle arrangement according to yet another embodiment and the emission of sound waves therefrom.

Additionally or alternatively, the outside door handle 6, a part thereof, and/or the vibration generator 10 itself can emit sound waves, preferably ultrasonic waves, as shown in FIG. 5. By means of these sound waves, in addition or alternatively to, the above described sensing of touch can be attained differently. Moreover, additional or alternative to the sensing of touch, proximity sensing can be done. These additional or alternative sensing possibilities are detailed hereinbelow.

As shown in FIG. 5 by the arrows 15, sound waves from the outside door handle 6 or a part thereof can be emitted into an interior space 16 between the outside door handle 6 and the assigned motor vehicle door 17 and/or to areas of the motor vehicle door 17 which are adjacent to the outside door handle 6. The sound waves can especially strike either directly on a section of the outside door handle 6 or can be reflected by adjacent areas of the motor vehicle door 17 to the outside door handle 6 and/or to a sensor 11 (not shown in FIG. 5) as is illustrated by the arrow 18.

In the particular embodiment shown in FIG. 5, it is provided that the vibration generator also works as a sensor which can acquire the vibrations which are cause by the sound waves striking the outside door handle 6 or a part thereof. Thus, in such an embodiment, attachment of a separate sensor 11 as was described above, is not necessary here.

The sound waves in the interior space 16 and/or in the spacial areas adjacent to it form a sonic barrier or a sonic field. When the hand of an operator which is not shown is moving into this sonic field, therefore approaches the outside door handle 6 especially by reaching into the interior space 16, the sonic barrier is interrupted or the sonic field is changed or disrupted, which can be acquired and evaluated accordingly, and proximity sensing and/or sensing of touch can be accomplished.

Additionally or alternatively, the outside door handle 6 and/or the vibration generator 10 itself, can emit into the exterior space, especially away from the assigned motor vehicle door 17 as shown in FIG. 5 by the wave fronts 19. If the sound waves strike the approaching hand of an operator, they are at least partially reflected towards the outside door handle 6. The reflected sound waves can in turn, be acquired and evaluated by a separate sound sensor and/or indirectly by its coupling into the outside door handle 6 or a part thereof. The resulting vibrations which are measured by the vibration generator and/or a separate sensor can be acquired and evaluated. Consequently, proximity sensing is possible in this way. In these cases where sound is radiated in addition or alternative to the arrangement of a sensor in or on the outside door handle 6, an arrangement of at least one sensor in or on adjacent areas of the assigned motor vehicle door 17 can be also accomplished.

Figure 6:
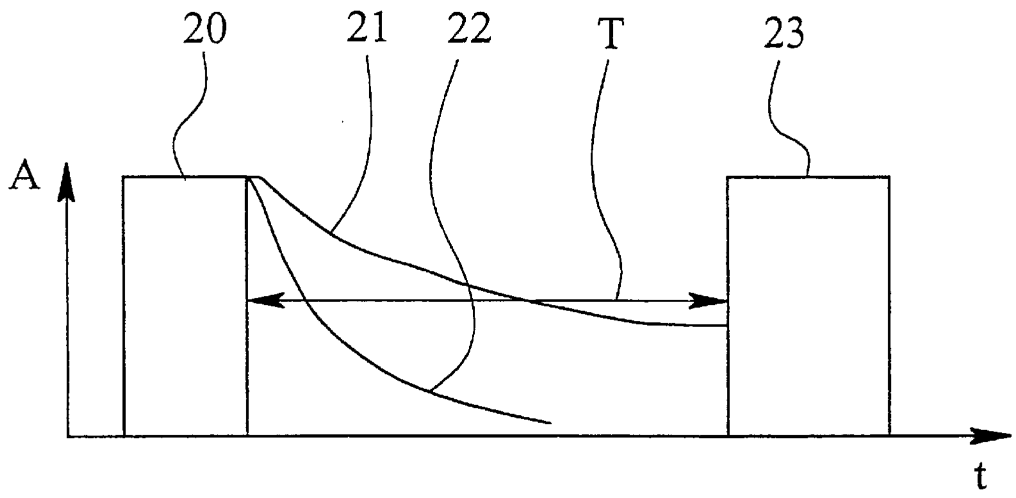
FIG. 6 shows a schematic illustration of the measured and acquired vibration amplitudes.

In the following, it is explained with reference to FIG. 6 by way of example how acquisition or evaluation can take place. In the schematic diagram as shown in FIG. 6 the horizontal axis is the time axis t. The vertical axis indicates the amplitude A of the vibration of the outside door handle 6 or a part thereof.

First of all, it should be noted that the outside door handle 6 is caused to vibrate preferably only in a pulsed manner, i.e. only at times, as indicated by the vibration or excitation pulse 20. Sensing of touch can take place very easily by acquiring and evaluating the decay or damping of the vibration of the outside door handle 6. Line 21 in FIG. 6 shows, for example, the behavior as the vibration decays when the outside door handle 6 is free. Line 22 shows, for example, the damping when the outside door handle 6 is being touched, i.e. when the hand of an operator touches the outside door handle 6. The much stronger damping upon touching can be acquired and evaluated so that it can be easily detected whether the hand of an operator is touching or is already activating the outside door handle 6.

The corresponding of course also applies when only part of the outside door handle 6, such as the handle shell 14 or the like, is caused to vibrate. This should be evident to one of ordinary skill in the art and need not be discussed in further detail here.

It should also be noted that the evaluation can take place directly in the electronics assigned to the sensor and/or in separate evaluation electronics or the like. Thus, it should be appreciated that the location of such evaluation is not critical to the practicing of the present invention. Such electronics can be readily devised by a person of ordinary skill in the electronics art and thus, need not be detailed here.

Additionally or alternatively, acquisition and evaluation can also be directed at a signal 23 occurring as the consequence of a vibration pulse 20, especially after a certain time T. The signal 23 can be a reflected signal which is produced by the outside door handle 6 being caused to vibrate by the vibration signal 20, by its emitting sound waves, and the sound waves being reflected back again towards the outside door handle, the reflection being caused by the approaching hand of an operator. This reflected signal again causes vibration in the outside door handle 6 which is then acquired as a signal 23. Measurement or acquisition can be done by the vibration generator 10 and/or a separate sensor 11 (not shown in FIGS. 5 and 6), or the like. The occurrence or lack of occurrence of the "reflection" signal 23 and/or the transit time T or its change can be evaluated in order to recognize or detect the approach of a hand of the operator. However, it is not necessary for the reflected sound waves to be coupled back into the outside door handle 6. Rather, it is also possible to directly measure or acquire the reflected sound waves by a corresponding sensor such as a microphone or an ultrasonic transducer.

Additionally or alternatively, there can be one such sensor which directly acquires the sound waves on or in the assigned door 17 or another section of the outside door handle 6 so that instead of reflections, an interruption of the sound propagation can be acquired which can then be evaluated as approaching and/or touching by an operator.

Another alternative, especially for sensing of touch, arises by acquiring and evaluating the characteristic of a vibration pulse along the outside door handle 6 or a part thereof instead of the sound radiation. For example, the vibration generator 10 can produce a vibration pulse 20 which then propagates along the outside door handle 6 especially with a characteristic speed. The vibration pulse can be acquired, for example, in the area at the opposite end of the outside door handle 6 by a sensor (not shown) located there, i.e. by the signal 23. The vibration pulse can also be reflected, for example, in the area of attachment or support of the outside door handle 6 and then, can be acquired by the vibration generator 10 or a correspondingly arranged sensor (not shown). Also in this case, a signal 23 is formed which occurs with a delay time or transit time T. When the hand of the operator touches the outside door handle 6, the time T and/or the amplitude and/or the shape of the signal 23 is changed. This can be acquired and evaluated for sensing the touch of the operator.

As already addressed, both sensing of proximity as well as sensing of touch can be done in accordance with embodiments of the present invention. For example, the evaluation can yield a first signal when an approach is detected or sensed in order to initiate the passive entry function or the starting interval of the control electronics 3. Then, with the corresponding authorization and with sensing of touching of the outside door handle 6 which is time-correlated accordingly, the central interlock system can be unlocked and/or the assigned motor vehicle lock 2 can be open. In the latter case, a switch assigned to the outside door handle 6 or the switching means 9 can be omitted. Nor is it necessary to build or support the outside door handle 6 or a part thereof, such as the handle shell 14, so that it is movable.

In the above described manner, the present invention allows the sensing of touch and/or approach to thereby enable early activation of the passive entry function and initiation of the starting interval of the control electronics 3. Thus, enough time is gained to unlock the motor vehicle lock 2 before the operator in fact actuates the outside door handle 6 to open the corresponding motor vehicle door or the motor vehicle lock.

In addition, it should be pointed out that the sensing of proximity or touching can also be used to control other motor vehicle functions and to activate other motor vehicle controls. Preferably, the corresponding control signals by the evaluation electronics 13 or other electronics are output for this purpose(s).

While various embodiments in accordance with the present invention have been shown and described, it is understood that the invention is not limited thereto. These embodiments may be changed, modified and further applied by those skilled in the art. Correspondingly, this invention is not limited to the details shown and described previously but also includes all such changes and modifications which are encompassed by the appended claims.

We claim:

1. Motor vehicle door luck system comprising:

at least one vehicle lock;

an outside door handle assigned to the vehicle lock;

at least one vibration sensor assigned to the outside door handle; and a vibration generating device in vibration transmissive association with the outside more handle for enabling generated by the vibration generating device to mechanically vibrate at least a part of the outside door handle;

wherein the sensor is adapted to sense a change in the vibrating of said at least a part of the outside door handle to thereby detect touching of the outside door handle by a hand of an operator on the basis of an evaluation of said change.

2. Motor vehicle door lock system as claimed in claim 1, wherein the sensor is adapted to acquire at least one of the frequency the damping, the amplitude and a transit time of the at least one of the vibration caused by vibrating of at least a part of the outside door handle.

3. Motor vehicle door lock system as claimed in claim 2, further including control electronics adapted to evaluate a change in at least one of the frequency, the damping, and the amplitude of said vibrations when the outside door handle is at least one of approached and touched by the hand of an operator.

4. Motor vehicle door lock system as claimed in claim 3, wherein the control electronics provides a signal output when the outside door handle is touched by the hand of the operator.

5. Motor vehicle door lock system as claimed in claim 4, wherein the control electronics is further adapted to provide the signal output when the change in at least one of the frequency, the damping, and the amplitude is of the vibration occurs with a minimum rate of change.

6. Motor vehicle door lock system as claimed in claim 3, wherein the control electronics is adapted to evaluate transit times of the sound waves.

7. Motor vehicle door lock system as claimed in claim 6, wherein the control electronics is further adapted to provide a signal output when the outside door handle is touched by the hand of the operator.

8. Motor vehicle door lock system as claimed in claim 5, wherein the control electronics includes a feedback means for readjusting at least one of the frequency and the amplitude of the vibration of at least a part of the outside door handle when the rate of change is below a lower boundary rate.

9. Motor vehicle door lock system as claimed in claim 1, further including:

at least one of a motor and a circuitry adapted to lock and unlock the at least one vehicle lock, a remote control module;

control electronics with a passive entry function to at least passively unlock said vehicle lock, and having means for sensing the remote control module in a reaction phase having an operator initiated starting interval, means for determining access authorization based on information from the remote control module in an authorization check interval, and means for initiating unlocking of the vehicle lock in an action interval; and wherein the detection of touching of the outside door handle by the sensor is evaluated by the control electronics as a signal to initiate the unlocking of the vehicle lock in the action interval.

10. Motor vehicle door lock system as claimed in claim 9, wherein the change in at least one of the frequency, the damping, and the amplitude is evaluated to initiate the starting interval.

11. Motor vehicle door lock system as claimed in claim 1, wherein the vibration generating device is electrically driven.

12. Motor vehicle door lock system as claimed in claim 11, wherein the vibration generating device produces ultrasonic vibrations.

13. Motor vehicle door lock system as claimed in claim 11, wherein the vibration generating device is adapted to provide pulsed vibrations.

14. Motor vehicle door lock system as claimed in claim 11, wherein the vibration generating device is located on the outside door handle.

15. Motor vehicle door lock system as claimed in claim 14, wherein the vibration generating device is assigned to the outside door handle in a manner to produce sound waves that are radiated by at least part of the outside door handle.

16. Motor vehicle door lock system as claimed in claim 11, wherein the vibration generating device is at least one of a piezovibration generator and a piezoelement.

17. Motor vehicle door lock system as claimed in claim 1, wherein the sensor is integrated into the vibration generating device.

18. Motor vehicle door lock system as claimed in claim 1, wherein the vibration generating device is adapted to vibrate at least a part of the outside door handle at a resonant frequency.

19. Motor vehicle door lock system as claimed in claim 1, wherein the sensor is an electrical sensor adapted to detect one of detect ultrasound and mechanical vibrations in an ultrasonic range.

20. Motor vehicle door lock system as claimed in claim 19, wherein the sensor is located on the outside door handle.

21. Motor vehicle door lock system a claimed in claim 1, wherein the sensor is an acceleration sensor and is located at an anti-node of the vibration.

22. Motor vehicle door lock system as claimed in claim 1, wherein the at least one sensor is two sensors assigned to at least a part of the outside door handle, the two sensors each providing a signal corresponding to at least one of vibration and sound waves that are caused by vibrating at least a part of the outside door handle, the signals of the two sensors being combined in determining touching of the outside door handle.

23. Motor vehicle door lock system as claimed in claim 1, further including a feedback means between the sensor and the vibration generating device for controlling at least one of the frequency and the amplitude of the vibrations.

24. Motor vehicle door lock system as claimed in claim 1, wherein the outside door handle includes an inner handle shell and an outer part, the inner handle shell being adapted to be vibrated by the vibration generating device.

25. Motor vehicle door lock system of claim 24, wherein at least one of the vibration generating device and the sensor is located between the inner handle and the outer part of the outside door handle.

26. Motor vehicle door lock system as claimed in claim 24, wherein the handle shell is connected to the outer part of the outside door handle via an idle stroke connection.

27. Motor vehicle door lock system as claimed in claim 1, wherein the vibration generating device is a piezoelement adapted to vibrate at least a part of the outside door handle in an ultrasonic range.

28. Motor vehicle door lock system as claimed in claim 27, wherein the vibration generating device is integral with the sensor for sensing at least one of vibration and sound waves that are caused by vibrating at least a part of the outside door handle.

29. Motor vehicle door lock system as claimed in claim 27, further including a sound sensor for acquiring ultrasound waves radiated by the vibration generating device, the sound sensor being positioned in a handle recess assigned to the outside door handle.

30. Motor vehicle door lock system as claimed in claim 27, wherein the vibration generating device is a piezovibration generator.

31. A method for controlling a motor vehicle door lock system adapted to detect touching of the outside door handle by a hand of an operator, comprising the steps of:

providing at least one vehicle lock;

providing an outside door handle assigned to the at least one vehicle lock;

using a vibration generating device to mechanically vibrate at least a part of the outside door handle;

sensing vibrations that are caused by the vibration of at least a part of the outside door handle and detecting a change in said vibrations to thereby detect touching of the outside door handle on the basis of an evaluation of said change.

32. The method of claim 31, wherein the step of vibrating at least a portion of the outside door handle is attained with the vibration that is an ultrasonic range.

33. The method of claim 31, wherein the step of detecting touching of the outside door handle is attained by monitoring at least one of decay and dampening of said vibration.

34. The method of claim 31, further including the step of unlocking the vehicle lock subsequent to the detection of touching of the outside door handle.

* * * * *